Patented Apr. 28, 1942

2,281,392

UNITED STATES PATENT OFFICE 2,281,392

BOILER COMPOUND

Edward Lewis Smead, Mexico City, Mexico, and Samuel Schmucker Sadtler, Springfield Township, Montgomery County, Pa., assignors to Henex, S. A., Mexico City, Mexico No Drawing. Application June 30, 1937, Serial No. 151,318

5 Claims. (Cl. 252—180)

This invention relates to the manufacture of new and improved preparations from the juices of groups of thick-leaved plants that grow in tropical or semi-tropical countries and are known by many names, agave, maguey, henequen, sisal and other plants of similar character, such as certain of the cactaceae, notably the prickly pear.

These juices are useful as boiler compounds, and, because of this mucilaginous character also have utility as stiffeners and fillers in calico-printing and for similar purposes.

A principal object of our invention is to produce a concentrated product from these plants substantially free from valueless or detrimental constituents.

Another object of our invention is to make a stable product that can be shipped, or stored before its use, and will not ferment.

Another object of our invention is to remove sugars, such as agavoSe, and the specific sugars of the cactus juice.

These sugars are fermentable and if permitted to remain in the juice, ferment, and render the preparation of little or no value, and have other disadvantages.

Another object of the invention is to prepare a concentration of these juices that is completely devoid of water.

Still another object of the invention is to prepare a concentration of these juices in which the acids have been converted into alkali or alkaline earth salts, thereby increasing the strength of the gummy constituents and preventing the corrosive action of said acids upon metals.

Other objects of the invention will in part be obvious and will, in part, appear hereinafter.

Among the obvious objects of the invention is the arrangement of a process which will produce the products named above.

The invention accordingly comprises the several steps and the relation of one or more of such steps with respect to each of the others, and the composition of matter possessing the features, properties, and the relation of elements, which are exemplified in the following detailed disclosure, and the scope of the invention will be indicated in the claims.

We are aware of the fact that henequen juice has been concentrated and used for boiler treatment, as claimed in U. S. Patent Number 2,012,-641, dated August 27, 1935, to Edward Lewis Smead, one of the applicants herein, but when our preparation is made from the juice of the same plant, the process of manufacture is not the same, and the product a very different entity.

In brief we take the juice of henequen, maguey or sisal or cactus plants and first ferment them to convert the fermentable sugars ino alcohol, which may be utilized or allowed to pass off into the air. After fermentation we prefer to filter off all sediment of insoluble pulp and yeasts. Our next step is to neutralize with an alkali such as sodium hydroxide or carbonate, or an alkali earth hydroxide such as calcium hydroxide, or to keep a certain desirable balance of salts of the acids of the juice we may use more than one base. This step of neutralization adds to the salts of the gummy acids and increases the effective strength of the preparation.

Our next step is to concentrate by evaporation to a syrupy consistency. This purified and concentrated product may be used as it is; it may have a preservative added to prevent the formation of moulds or other organisms; or it may be dried to a powder by being blown into a heated chamber that is kept under reduced pressure by well known processes. As we have removed the reducing sugars which are more or less hygroscopic, we produce a fine stable powder than can be easily shipped or stored.

In order to make our invention clearer we will separately describe three ways of proceeding: A—concentrating to syrupy consistency; B—producing a powder; and C—producing a dry residue.

The plants of the agave genus are the course of the fibers used to manufacture binder's twine and many kinds of rope.

In order to obtain these fibers, the thick fleshy portion of the leaves are scraped away from the fibers, this producing a juicy pulp called "bagazo" in Mexico. The juice is pressed down from this pulp and utilized in the process now to be more particularly described.

*Method A*

In practice we run the juice into wooden fermenting vats. Due to the yeast cells naturally on these plants, fermentation soon begins, especially in warm countries, and the time of fermentation may be reduced by using cultures of yeasts, such as the naturally occurring yeasts on the plants. In practice when juice is obtained daily, the vats are not cleaned and yeast cells in them quickly start fermentation, aided by what comes in with the juice. After about 48 hours the fermentation is generally complete, although it may take longer with new tanks. It is desirable that the liquor be filtered as soon as the fermentation is completed and at once neutralized. A tank of twelve drum capacity each drum being able to contain 208 liters of crude henequen juice will probably require at the rate of about 2.7 grams of soda ash, of 98% purity per liter, or about 6.5 kilos per tank of this content of juice. When sodium hydroxide is used for neutralizing extra large tanks are not required, but with soda ash, due to the frothing, the tanks should be oversize to hold the froth. Of course milk of lime does not cause much froth. The neutralization point is easily determined by well known indicator means, such as the use of litmus.

When the liquor has been neutralized it may be evaporated in ordinary steel tanks with steam coils or any other suitable way, such as stills, which permit recovery of volatile products. We generally evaporate to 20 or 22° Bé., at 15° centigrade and may add any suitable preservative such as phenolic compounds, formaldehyde, etc. When we use formaldehyde we cool the liquor first in drums or covered tanks and add about one-half of one percent or less to prevent mould growths.

Method B

We proceed as in Method A to the obtaining a thick solution but go to a somewhat higher concentration of say 30° Bé. and then inject this in a hot spray into a heated and evacuated chamber to produce a powder, the volatile products being condensed if desired.

Method C

A dry product may also be advantageously made by passing the liquor which has been evaporated to a thick syrupy consistency over heated drums preferably encased in a vacuum chamber to dry the thick juice to a solid film. In this method we may also recover the volatile products.

If we are dealing with the cactus plants, we crush them to extract the juice and proceed to apply the process to the juice as above described.

Since certain changes in carrying out the above process, and certain modifications in the composition of matter which embody the invention may be made without departing from its scope it is intended that all matter contained in the above description shall be interpreted as illustrative and not in a limiting sense.

We claim:
1. The process of obtaining boiler compounds from the juice of plants of the agave species which comprises preparing a juicy pulp from said plants, pressing the juice therefrom, then subjecting the juice to fermentation by organisms normally present on the plant, then adding a compound selected from the group consisting of sodium hydroxide and calcium hydroxide to neutralize the product, thereby forming salts, filtering the product and concentrating the filtrate to at least 20° Baumé.

2. A non-fermentable boiler compound consisting of the spontaneously fermented juice pressed from a plant of the agave genus, which preparation comprises the neutralized salts of the acids which naturally occur in the juice as well as those produced by said fermentation, and is of a concentration of at least 20 degrees Beaumé.

3. A non-fermentable boiler compound consisting of the spontaneously fermented juice pressed from the henequin plant which preparation comprises the neutralized salts of the acids naturally occurring in the said juice and those produced by its fermentation and is of a concentration of at least 20 degrees Beaumé.

4. A boiler compound comprising the clear residue of liquid from the yeast fermentation of the pressed juice of a plant of the agave genus, which preparation is neutral and has a density of between 20 degrees Baumé and complete dryness, inclusive, contains the reaction products of all the acids which occur in said residual liquid with a metallic hydroxide selected from the group consisting of sodium and calcium hydroxides.

5. A boiler compound comprising the clear residue of liquid from the yeast fermentation of the pressed juice of the henequin plant, which preparation has a density of at least 20 degrees Beaumé is neutral in reaction and contains the reaction products of all the acids occurring in said residue liquid with metallic hydroxide selected from the group consisting of sodium and calcium hydroxides.

EDWARD LEWIS SMEAD.
SAMUEL SCHMUCKER SADTLER.